United States Patent
Wadman et al.

(10) Patent No.: US 10,198,604 B2
(45) Date of Patent: Feb. 5, 2019

(54) DETECTION OF UNAUTHORIZED TAGS

(71) Applicant: Sony Corporation, Tokyo (JP)

(72) Inventors: Johan Wadman, Lund (SE); Peter Ljung, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 157 days.

(21) Appl. No.: 14/892,591

(22) PCT Filed: Feb. 21, 2014

(86) PCT No.: PCT/JP2014/000926
§ 371 (c)(1),
(2) Date: Nov. 20, 2015

(87) PCT Pub. No.: WO2015/125175
PCT Pub. Date: Aug. 27, 2015

(65) Prior Publication Data
US 2016/0092705 A1 Mar. 31, 2016

(51) Int. Cl.
*H04Q 5/22* (2006.01)
*G06K 7/10* (2006.01)

(52) U.S. Cl.
CPC ..... *G06K 7/10257* (2013.01); *G06K 7/10009* (2013.01)

(58) Field of Classification Search
CPC .............. G06K 7/10257; G06K 7/10009
USPC ................ 340/10.1–10.6, 572.1–572.9
See application file for complete search history.

(56) References Cited

U.S. PATENT DOCUMENTS

| | | | | |
|---|---|---|---|---|
| 2003/0234718 A1* | 12/2003 | Fujisawa | ............... | G06K 7/0008 340/5.1 |
| 2005/0093698 A1* | 5/2005 | Sakamoto | ............ | G06K 7/0008 340/572.1 |
| 2005/0099298 A1* | 5/2005 | Mercer | ................ | G06K 7/0008 340/572.1 |
| 2005/0099302 A1* | 5/2005 | Lieffort | .............. | G06K 7/10039 340/572.7 |

(Continued)

FOREIGN PATENT DOCUMENTS

| | | |
|---|---|---|
| EP | 1 522 949 A1 | 4/2005 |
| TW | 200519759 | 6/2005 |

OTHER PUBLICATIONS

Notification of Transmittal of the International Search Report and Written Opinion of the International Searching Authority, International Application No. PCT/JP2014/000926, dated Nov. 13, 2014.

(Continued)

*Primary Examiner* — Kerri L McNally
*Assistant Examiner* — Thang D Tran
(74) *Attorney, Agent, or Firm* — Myers Bigel, P.A.

(57) ABSTRACT

Systems and methods for detecting unauthorized tags are provided. A tag transmission report is received from a tag reader that receives wireless transmissions from a plurality of tags. A tag ID is determined for each tag of the plurality of tags in the tag transmission report. The determined tag IDs are compared to association information indicating associations between tag IDs. A notification is generated responsive to a comparison indicating that ones of the plurality of tags are not associated with other tags of the plurality of tags.

16 Claims, 8 Drawing Sheets

(56) References Cited

U.S. PATENT DOCUMENTS

| | | | | |
|---|---|---|---|---|
| 2005/0247779 | A1* | 11/2005 | Ohkubo | G06K 7/10346 235/383 |
| 2006/0267770 | A1* | 11/2006 | Sanari | G08B 13/19645 340/572.1 |
| 2007/0008138 | A1* | 1/2007 | Mosher, Jr. | G06K 7/0008 340/572.4 |
| 2007/0262852 | A1* | 11/2007 | Yamamura | G06F 21/31 340/10.51 |
| 2007/0285238 | A1* | 12/2007 | Batra | G01K 1/024 340/572.1 |
| 2008/0094220 | A1* | 4/2008 | Foley | G06Q 20/327 340/572.4 |
| 2008/0273684 | A1* | 11/2008 | Profanchik | G08B 13/2417 379/207.02 |
| 2009/0021343 | A1* | 1/2009 | Sinha | H04L 63/1408 340/5.2 |
| 2009/0079580 | A1* | 3/2009 | Kaplan | G08B 21/0227 340/686.6 |
| 2010/0148964 | A1* | 6/2010 | Broer | G06K 7/10356 340/572.1 |
| 2010/0150348 | A1* | 6/2010 | Fairbanks | H04L 9/0863 380/255 |
| 2010/0198873 | A1* | 8/2010 | Falk | G06F 21/35 707/784 |
| 2010/0306672 | A1* | 12/2010 | McEniry | G06Q 10/10 715/753 |
| 2011/0273294 | A1* | 11/2011 | Harwell | G06Q 10/08 340/572.1 |
| 2011/0291803 | A1* | 12/2011 | Bajic | G08B 13/2462 340/10.1 |
| 2011/0316674 | A1* | 12/2011 | Joy | G06Q 10/087 340/10.1 |
| 2012/0019363 | A1* | 1/2012 | Fein | G06K 19/072 340/10.1 |
| 2012/0056722 | A1* | 3/2012 | Kawaguchi | G06K 7/10009 340/10.1 |
| 2012/0095921 | A1* | 4/2012 | Naono | G06Q 30/06 705/50 |
| 2012/0119882 | A1* | 5/2012 | Horst | G06K 7/0008 340/10.1 |
| 2012/0268244 | A1* | 10/2012 | Ljung | H04W 4/028 340/5.65 |
| 2013/0106575 | A1* | 5/2013 | Kangas | G06K 7/10079 340/10.1 |
| 2013/0169413 | A1* | 7/2013 | Schuessler | G08B 13/2417 340/10.1 |
| 2014/0118113 | A1* | 5/2014 | Kaushik | H04W 12/12 340/8.1 |
| 2014/0125800 | A1* | 5/2014 | Van Nest | G08B 13/246 348/143 |
| 2014/0148196 | A1* | 5/2014 | Bassan-Eskenazi | G01S 11/02 455/456.1 |
| 2014/0266804 | A1* | 9/2014 | Asadpour | G08G 1/143 340/932.2 |
| 2014/0327524 | A1* | 11/2014 | Jones | G06K 7/10386 340/10.42 |
| 2014/0347193 | A1* | 11/2014 | Ljung | H04L 67/04 340/870.01 |
| 2016/0283759 | A1* | 9/2016 | Forster | G06K 7/0008 |

OTHER PUBLICATIONS

Office Action corresponding to Chinese Patent Application No. 201480075957.0 (11 pages)(dated Feb. 26, 2018).

Office Action corresponding to Chinese Patent Application No. 201480075957.0 (2 pages Chinese-6 pages English Translation) (Dated Sep. 26, 2018).

* cited by examiner

Generate a notification responsive to a comparison indicating that at least one of the plurality of tags in the tag transmission report does not have ownership information matching ownership information of all the other tags of the plurality of tags
500

Generate a notification responsive to a comparison indicating that at least one of the plurality of tags in the tag transmission report does not have ownership information matching ownership information of a majority of the other tags of the plurality of tags
510

Generate a notification responsive to a comparison indicating ownership information of ones of the plurality of tags does not match ownership information of the tag reader
520

Generate a notification responsive to the first movement pattern of tag IDs of a first set of tags not matching the second movement pattern of tag IDs of a second set of tags for a first time period and then matching the second movement pattern during a second time period
530

Generate a notification responsive to ownership information of tag IDs of a first set of tags sharing a movement pattern with but not matching ownership information of tag IDs of a second set of tags
540

DETECTION OF UNAUTHORIZED TAGS

CROSS REFERENCE TO RELATED APPLICATION

This application is a 35 U.S.C. § 371 national stage application of PCT International Application No. PCT/JP2014/000926, filed on 21 Feb. 2014, the disclosure and content of which is incorporated by reference herein in its entirety.

TECHNICAL FIELD

Embodiments of this invention relate to detecting unauthorized tags.

BACKGROUND ART

Radio Frequency Identification (RFID) tags may be embedded in or attached to items that can store identification information and other details. Tags may be small devices, such as a label, with a miniature embedded antenna. A tag reader may interrogate the tag by transmitting an RFID signal, which energizes the embedded antenna to provide power for the tag to transmit a responsive RFID signal to the tag reader. Some tags may have a power source and circuitry to provide transmissions or broadcasts to be picked up by tag readers. Tag readers may be stationary or mobile.

RFID tags may be used to gather information for many commercial and consumer purposes. However, as with most technologies, tags may be misused. Unauthorized tags, or tags owned by someone else or placed without notice or permission, may be placed in, on or near one's personal or business items. For example, paparazzi photographers may place tags on celebrities' cars. Some tags may be used to track an unsuspecting person. Thieves may use tags to track when home owners are leaving the home.

SUMMARY

In some embodiments of the present invention, a computer-implemented method for detecting unauthorized tags may include receiving a tag transmission report from a tag reader that receives wireless transmissions from a plurality of tags and determining a tag identification (ID) for each tag of the plurality of tags in the tag transmission report. The method may also include comparing the determined tag IDs to association information indicating associations between tag IDs and generating a notification responsive to a comparison indicating that ones of the plurality of tags are not associated with other tags of the plurality of tags.

According to some embodiments, the association information may include owner information for each tag ID of tags of the plurality of tags and the method may include generating a notification responsive to a comparison indicating that at least one of the plurality of tags in the tag transmission report does not have ownership information matching ownership information of all the other tags of the plurality of tags. In other embodiments, the method may include generating a notification responsive to a comparison indicating that at least one of the plurality of tags in the tag transmission report does not have ownership information matching ownership information of a majority of the other tags of the plurality of tags.

According to some embodiments, the association information may include owner information for each tag ID of tags of the plurality of tags and the tag reader, and the method may further include generating the notification responsive to a comparison indicating ownership information of ones of the plurality of tags does not match ownership information of the tag reader.

According to some embodiments, the association information may define tag IDs of a first set of tags of the plurality of tags and tag IDs of a second set of tags of the plurality of tags. The method may further include generating a notification responsive to ownership information of tag IDs of the first set of tags sharing a movement pattern but not matching ownership information of tag IDs of a second set of tags. According to some embodiments, a movement pattern may be identified by receiving a tag ID in a first transmission report from a first tag reader in a first location at a first time and then receiving the tag ID in a second transmission report from a second tag reader at a second location at a second time period, indicating a movement of the tag corresponding to the tag ID.

According to some embodiments, the first set of tags may share a first movement pattern and the second set of tags may share a second movement pattern. The first set of tags may be greater in number than the second set of tags and exclusive of the second set of tags. The method may further include generating a notification responsive to the first movement pattern not matching the second movement pattern for a first time period and then matching the second movement pattern during a second time period. The first time period and the second time period may be consecutive and the second time period may follow the first time period.

According to some embodiments, a computer-implemented method for detecting unauthorized tags may include receiving, at a tag reader, wireless transmissions from a plurality of tags and determining a tag ID for each tag of the plurality of tags. The method may further include comparing the determined tag IDs to association information indicating associations between tag IDs and generating a notification responsive to a comparison indicating that ones of the plurality of tags are not associated with other tags of the plurality of tags.

According to some embodiments, the association information may include owner information for each tag ID of tags of the plurality of tags and the method may further include generating a notification responsive to a comparison indicating that at least one of the plurality of tags does not have ownership information matching ownership information of all the other tags of the plurality of tags. In other embodiments, the method may further include generating a notification responsive to a comparison indicating that at least one of the plurality of tags does not have ownership information matching ownership information of a majority of the other tags of the plurality of tags.

According to some embodiments, the association information may include owner information for each tag ID of tags of the plurality of tags and the tag reader, and the method may further include generating the notification responsive to a comparison indicating ownership information of ones of the plurality of tags does not match ownership information of the tag reader.

According to some embodiments, the association information may define tag IDs of a first set of tags of the plurality of tags sharing a movement pattern and tag IDs of a second set of tags of the plurality of tags also sharing the movement pattern, and wherein the generating a notification comprises generating a notification responsive to ownership information of tag IDs of the first set of tags not matching ownership information of tag IDs of the second set of tags.

According to some embodiments, the association information may define tag IDs of a first set of tags of the plurality of tags sharing a first movement pattern and tag IDs of a second set of tags of the plurality of tags sharing a second movement pattern. The first set of tags may be greater in number than the second set of tags and exclusive of the second set of tags. The method may also include generating a notification responsive to the first movement pattern not matching the second movement pattern for a first time period and matching the second movement pattern during a second time period. The first time period and the second time period may be consecutive and the second time period may follow the first time period.

According to some embodiments, a mobile communication terminal may include a processor, a communication interface coupled to the processor that is configured to receive wireless transmissions from a plurality of tags, and a memory coupled to the processor and comprising computer readable program code embodied in the memory that when executed by the processor causes the processor to perform operations. The operations may include determining a tag ID for each tag of the plurality of tags and comparing the determined tag IDs to association information indicating associations between tag IDs. The operations may also include generating a notification responsive to a comparison indicating that ones of the plurality of tags are not associated with other tags of the plurality of tags.

According to some embodiments, the association information may include owner information for each tag ID of tags of the plurality of tags and the operations may include generating a notification responsive to a comparison indicating that at least one of the plurality of tags does not have ownership information matching ownership information of all the other tags of the plurality of tags. In other embodiments, the operations may include generating a notification responsive to a comparison indicating that at least one of the plurality of tags does not have ownership information matching ownership information of a majority of the other tags of the plurality of tags.

According to some embodiments, the association information may comprise owner information for each tag ID of tags of the plurality of tags and the mobile communication terminal. The method may include generating a notification responsive to a comparison indicating ownership information of ones of the plurality of tags does not match ownership information of the mobile communication terminal.

According to some embodiments, the association information may define tag IDs of a first set of tags of the plurality of tags sharing a movement pattern and tag IDs of a second set of tags of the plurality of tags also sharing the movement pattern. A notification may be generated responsive to ownership information of tag IDs of the first set of tags not matching ownership information of tag IDs of the second set of tags.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF DRAWINGS

The accompanying drawings, which are included to provide a further understanding of the invention and are incorporated in and constitute a part of this application, illustrate certain embodiment(s) of the invention.

DESCRIPTION OF EMBODIMENTS

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module," "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Tags may be used to track items or people for commercial or personal purposes. The tags may be attached to moveable objects and may be any shape/size that can be incorporated into/on the moveable objects. Moveable objects can include, without limitation, wallets, keys, bags, mobile telephones, clothing, automobiles or other moveable items. Tags may include devices, labels or printed inks on paper.

However, unauthorized tags may be placed in or on a person's personal or business items. These unauthorized tags may be used to obtain information about the person and/or his or her items. For example, a tag may be placed on a car or in a bag unbeknownst to the owner. Movements and locations of the bag and/or bag owner may be tracked by an owner of the unauthorized tag by tracking its spy tag through its own tracking service subscription. Embodiments described herein may provide for detection of unauthorized tags.

A tag may have an "owner" if it is placed by or authorized by a user identified as the owner. For example, a tag may have an ID with ownership information that is associated with or matches information of the owner. An unauthorized tag may be a tag that is not owned by the owner and/or has an ID with ownership information that does not match information of the owner. The tag ID may not be otherwise associated with or linked to information assigned to or established for the owner. An unauthorized tag may be placed in or on an object without the notice or permission of the owner of the object.

Tags may transmit wireless signals, such as broadcasts with tag ID information. Many types of tags may lack a power source and transmit a tag ID as an inductive response to a received signal. Other tags may have a power source and/or include additional circuitry for receiving signals and processing commands.

Figure 1:
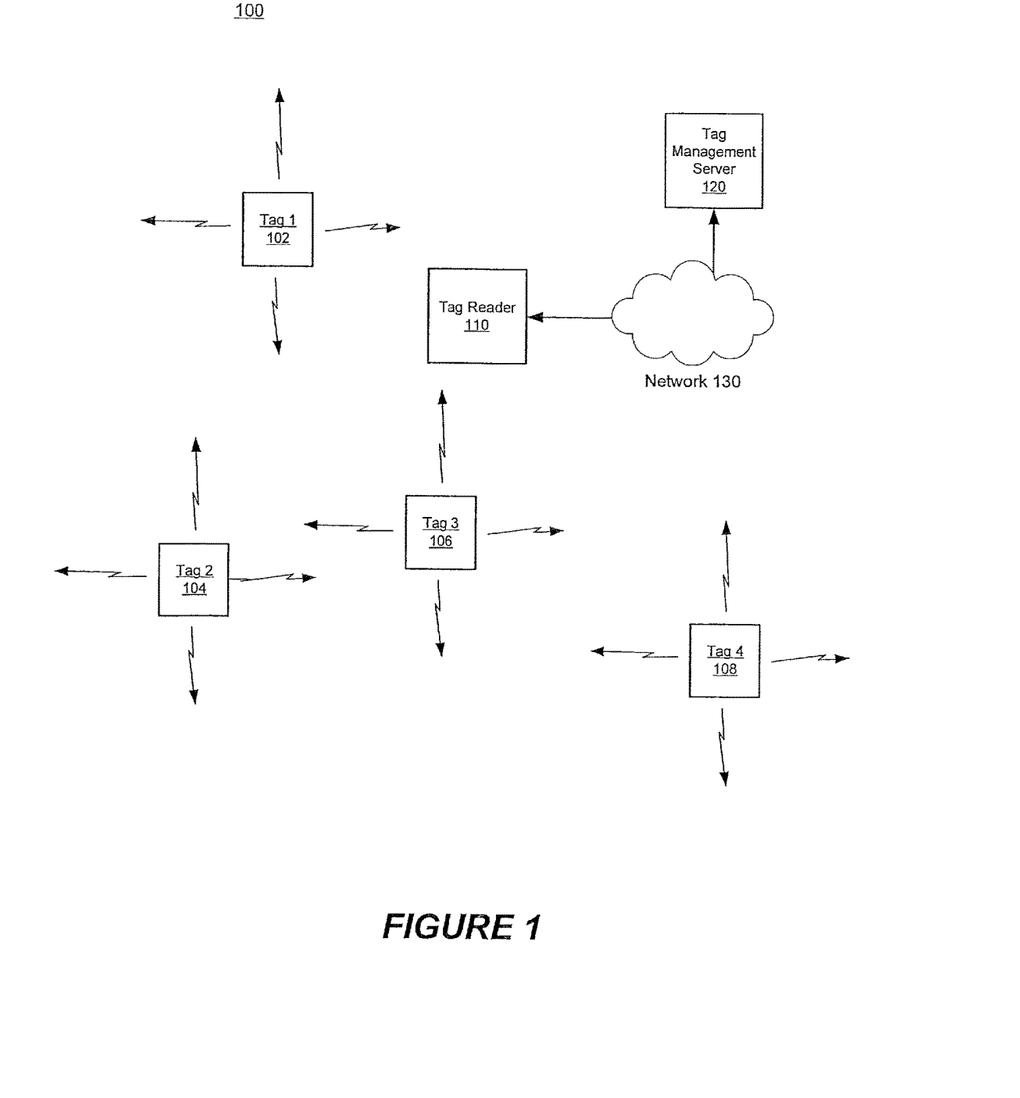
FIG. 1 is a schematic illustration of a tag reader receiving tag transmissions according to some embodiments of the invention.
Figure 2A:
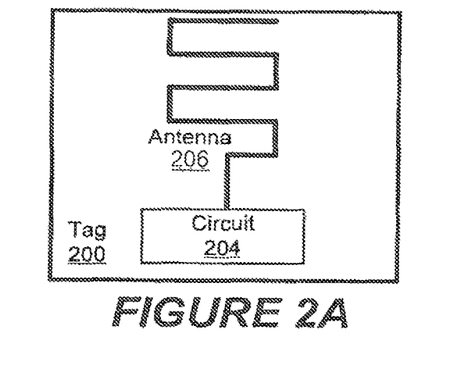
FIGS. 2A-2C are schematic block diagrams that illustrate tags according to some embodiments.
Figure 2B:
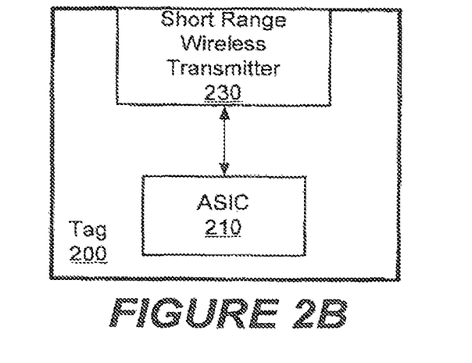
Figure 2C:
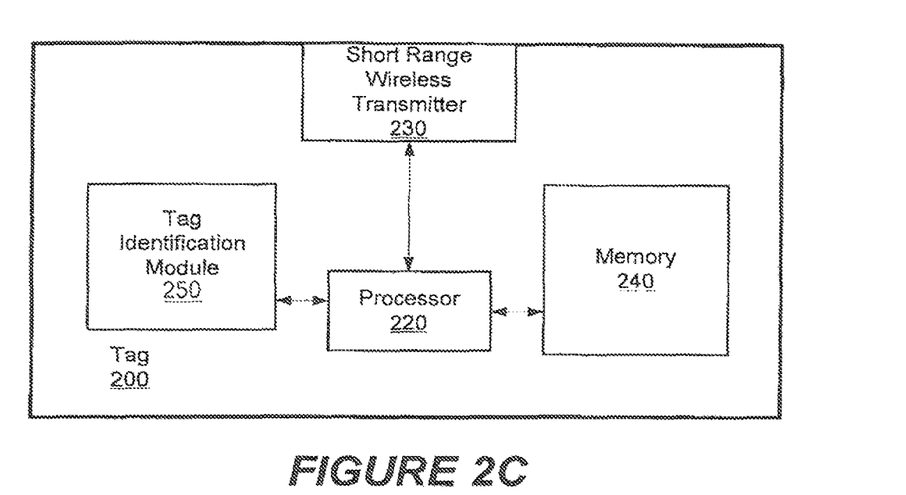

FIG. 1 illustrates a diagram 100 of tags 102-108 that may transmit wireless signals or broadcasts, FIGS. 2A-2C are block diagrams illustrating a tag 200 according to some embodiments, FIG. 2A illustrates a block diagram of a simple tag which has an embedded antenna 206 that receives a tag reader signal that energizes tag 200 so that it may have power to transmit a responsive RFID signal to the tag reader. Such a tag may also include a circuit 204 for transmitting a tag ID. For example, circuit 204 may include an NFC circuit (accessory NFC circuit) that can be powered by and communicate with a UE NFC circuit using short-range high frequency wireless communication technology which enables the exchange of data between devices over about a 10 cm distance, although the NFC circuits are not limited to operating in at any defined range. The communication protocol and operation can be an extension of the ISO 14443 proximity-card standard (contactless card, RF) and can be specified in the ECMA-340 and ISO/IEC 18092 technology standards. Some embodiments of the NFC circuits may communicate using existing ISO 14443 smartcards and readers and can thereby be compatible with existing, contactless communication infrastructure.

The NFC circuits may communicate via magnetic field induction. A loop antenna connected to the NFC circuit and a loop antenna of the accessory NFC circuit may be placed in close proximity to each other within the other's antenna near field, thereby effectively forming an air-core transformer. Some embodiments of the NFC circuits can transmit within the globally available and unlicensed radio frequency ISM band of 13.56 MHz, with a bandwidth of almost 2 MHz. Some embodiments of the NFC circuits can support data rates of 106, 212, or 424 kbit/s using a modified Miller coding or Manchester coding to encode and decode communicated data.

The accessory NFC circuit can be configured to operate in a passive communication mode, because the tag 200 does not have its own power source. In contrast, the UE NFC circuit can be configured to operate in an active communication mode if the tag 200 has a power source, e.g., rechargeable battery. When operating in the passive communication mode, the UE NFC circuit provides a carrier field and the accessory NFC circuit answers by modulating the carrier field. In this mode, the accessory NFC circuit generates its operating power from the NFC circuit provided electromagnetic field, thus making the accessory NFC circuit a transponder. In some other embodiments the accessory NFC circuit contains a power supply and is configured to operate in an active communication mode.

The NFC circuit includes a charging circuit that can become inductively coupled to the UE NFC circuit through the transceiver circuit to generate power therefrom, and which it provides to a transceiver circuit. The transceiver circuit transmits data through the antenna to the UE NFC circuit using the power from the charging circuit. The transceiver circuit may optionally be configured to receive data through the antenna from the UE NFC circuit.

As illustrated in FIG. 2B, tag 200 may include a short-range wireless transmitter 230. Transmitter 230 may include a transmitter circuit to transmit radio frequency communication signals via an antenna system. The antenna system may include an antenna feed structure and one or more antennas. In some embodiments, transmitter 230 may include a transceiver circuit that is operative to also receive communication signals. Tag 200 may include an Application Specific Integrated Circuit (ASIC) circuit 210 for transmitting a tag ID and/or for other logic operations.

In some cases, as shown in FIG. 2C, tag 200 may also include a processor 220 that includes circuits for overall operation of the tag 200 including coordination of communications via transmitter 230. Processor circuit 220 may be configured to communicate data over the transmitter 230 according to one or more short range wireless communication protocols, such as Bluetooth(registered trademark) protocols, ANT protocols, WLAN protocols (e.g., 802.11a, 802.11b, 802.11e, 802.11g, and/or 802.11i), or other short range wireless communication protocols. The transmitter 230 may be, for example, a low power Bluetooth(registered trademark) protocol transmitter or an ANT protocol transmitter, such as those designed and marketed by Dynastream Innovations Inc., a Cochrane, Canada based company.

The processor 220 may be implemented using a variety of hardware and software. For example, operations of the processor 220 may be implemented using special-purpose hardware, such as an ASIC, and/or programmable logic devices such as gate arrays, and/or software or firmware running on a computing device such as a microprocessor, microcontroller or digital signal processor (DSP).

Tag 200 may also include a tag identification module 250 that operates with memory 240 to store identification information, such as a unique tag ID. The tag ID may also uniquely identify a moveable object attached to the tag. For example, two different moveable objects can have respective tags that each store different ID information that can be used to distinguish the two moveable objects. In some embodiments, tag 200 may have a power source or may be connected to a power source.

As shown in FIG. 1, a tag reader or sensor, such as tag reader 110, may receive wireless transmissions from tags 102-108. In some embodiments, tag reader 110 may be a mobile communication terminal. A mobile communication terminal may be, for example, a smart phone, Personal Data Assistant (PDA), laptop, tablet, scanner or any other mobile computing device that may have capabilities including cellular telecommunication, Internet/intranet access, and/or a global positioning system (GPS) service. The mobile communication terminal may also support Wi-Fi communication over a local wireless network or the like. While tag readers are generally described herein as mobile devices moving into proximity of a movable object being located, it will be understood that the tag readers may also be non-mobile devices having locations associated therewith that detect movement of a movable object into their proximity (i.e., within range of a short range wireless protocol network supported by the tag reader).

Tag reader 110 may format and/or communicate the received tag transmissions to another computer, such as tag management server 120, over network 130. Network 130 may be any network commonly employed to provide voice and data communications to subscribers.

The transmissions may be transmitted in a tag transmission report. The tag transmission report may be a single transmission to server 120 or a number of transmissions to server 120 over a period of time. A tag transmission report may include one or more tag IDs. According to some embodiments, tag reader 110 or server 120 can determine location information (or have location information determined), using for example GPS, which may be provided to a location service/computer server (location server) where this location information may be associated with the ID Information for each moveable object. As the location information is periodically determined, it can be used to update the location information for the moveable objects. The location information can also include a time and/or history for each location of the moveable object.

Figure 3:
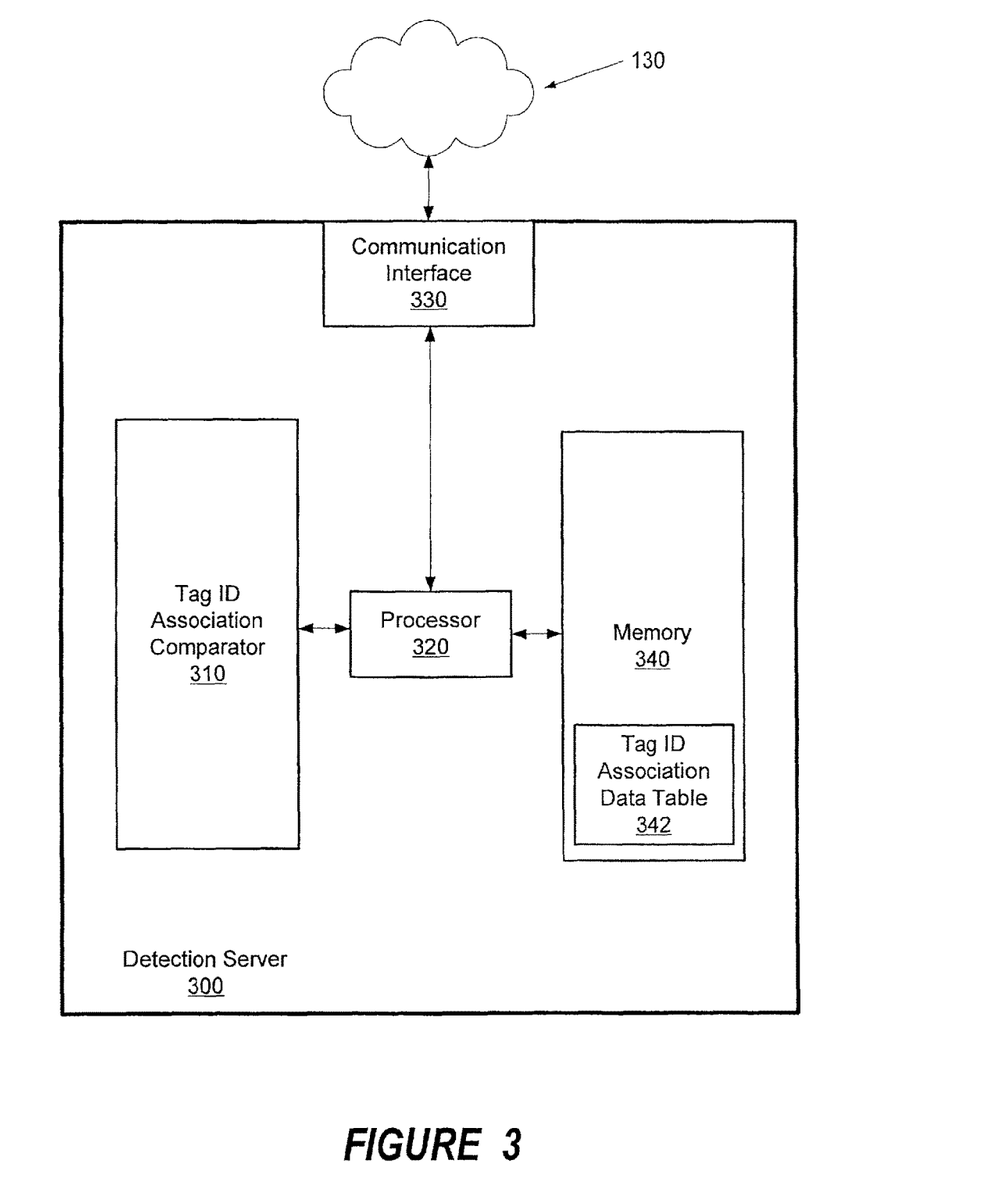
FIG. 3 is a schematic block diagram that illustrates a detection server according to some embodiments.

FIG. 3 is a block diagram that illustrates an example server, such as detection server 300, according to some embodiments. Detection server 300 may include a processor 320 to control a communication interface 330 that receives tag transmission reports from tag reader 110 over network 130. The range of the short range wireless transmission protocol and supporting devices assures that any read tags are within a close proximity of the tag reader 110 at the time of receipt of the tag transmissions.

Detection server 300 may include a memory 340 that may include a data structure, such as tag ID association data table 342, for storing tag ID ownership information and association information between tag IDs. Tag ID association comparator 310 may be configured to compare tag IDs and ownership information of tag IDs.

Memory 340 may store computer program instructions that, when executed by the processor circuit 320, carry out the operations described herein and shown in the figures. The memory 340 can be a volatile memory or a non-volatile memory, such as EEPROM (flash memory), that retains the stored data while power is removed from the memory 340.

An unauthorized tag may or may not be registered. Tag registration may be used to connect the owner of a tag to the actual physical tag. Typically, tags are not connected to any user/owner when purchased from the store. In order to take ownership of the tag, the user/owner must register himself or herself as the owner of the tag before it is used. Common solutions for this kind of secure registration are typically based on a secret password or code (for example, supplied on paper) attached with the physical tag. The password is then used as a key to allow registration of the tag product. In some embodiments as described herein, tags may be registered through a tag reader (typically a mobile communication terminal associated with an owner) at the time when the tag is activated.

As such, registration may be done in a secure manner without the need for any secret code. This may simplify both logistics in production and improve usability for the end consumer (purchaser/owner). Tags may include short range transmitters, such as transmitter 230, so that the tags are detectable only in close proximity of the tag itself (i.e., the transmitted identification of the tag is only received over a limited range). In addition, tags may be anonymous to tag readers such that the tag's identity generally cannot be derived by scanning its code on a single occasion.

In some embodiments, registration of a newly purchased tag using a mobile terminal as a tag reader may include unpacking the tag from its packaging, activating the tag with the tag reader or mobile terminal, authenticating the user, scanning for other unregistered tags, powering the tag by pushing a one-way button or removing a slip from its case. Such an approach may enable the tag to start beacon transmission of its self-identity. The one-way operation of the activation should maintain transmission of the tag with its self-identity beacon until its internal battery is exhausted as a user may not turn the power off using the one-way button. The tag may then be sensed by the mobile terminal. The tag may be presented to the user, for example, on a display of the mobile terminal or cloud server. The user may select the new tag as the target for registration and, by this action, accept himself or herself as the owner for the new tag. The ownership information is then stored by the cloud service and perhaps by the tag reader. In some embodiments, tag registration for this specific tag is allowed only once.

Embodiments utilizing such a registration approach may provide for a simple but also very secure registration process. In some embodiments, if the tag registration has failed and an unlawful user has taken ownership of the tag, it is still possible to use a secret code that allows the tag to be unregistered by the valid owner (for example, by over-riding the initial registration). This may enable the tag to be registered again following the scenario described of failed registration. In such embodiments, the tag may be powered during re-registration but registration will not be allowed until it has been unregistered (deregistered).

Unregistration/deregistration may also be performed without the use of any code by the lawful/valid owner of the tag. Because an owner is authenticated towards the location service, they may be allowed to unregister any of the tags that they have previously registered. Such an approach may be used to, for example, transfer tags to a new owner after purchase by the original owner.

The owner of a tag may be permitted to relay any kind of permission to other users once registered. For instance, it may be useful to enable tags to be shared between family members. Permission transfer may be enabled by generating a secret key, specific for the tag, which is then transmitted. The transmission may be over any suitable communication channel, such as short message service (SMS) or email. Other ways of transmitting permissions are also possible. In some embodiments, permissions are transferred by transmitting a secret key known only to owner, location service and, after transmission, the other selected user. The secret key in some embodiments is temporary and only valid for a limited number of other users.

In further embodiments, it is possible to support a public registration identity of the tag that is only used during registration. The public registration identity/code may be a single or few letters or digits and is not the tag's transmitted self-identity (which is typically 64 bits). The registration code may, for example, be printed on the tag itself or on a label attached to the tag. During registration, the public code may be retrieved from the location service to differentiate between different tags that are all unregistered and powered. This may be useful, for example, in a corporate environment where many tags are registered at once in a single local vicinity.

If registered, ownership information may be necessary to determine if a tag belongs to another owner. In many cases, tag reader 110 does not know the ownership information of the tags. Detection server 300, or any other remote or cloud service, may store ownership information for the tags. In other cases, ownership information of other tags may not be known or necessary to determine if a tag is unauthorized.

Figure 4:
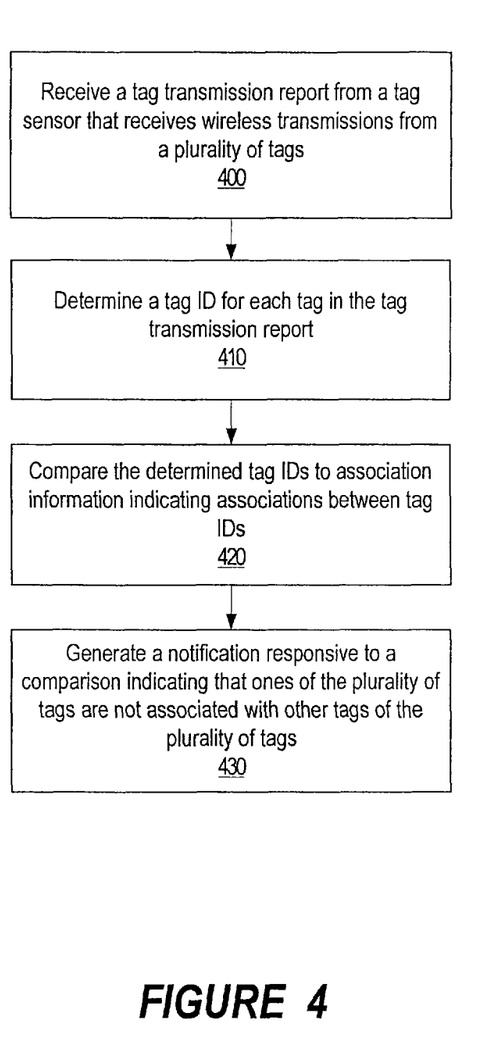
FIG. 4 is a flowchart that illustrates operations of a method for detecting unauthorized tags according to some embodiments.

FIG. 4 is a flowchart that illustrates operations of a method for detecting an unauthorized tag, according to some embodiments. In block 400, a tag transmission report is received from a tag reader that receives wireless transmissions from a plurality of tags. The tag transmission reports may be received by a computing device of a remote service or cloud service, which may include one or more servers such as detection server 300.

A tag ID is determined for each tag in the tag transmission report (block 410). For tags in the transmission report with tag IDs, the tag ID is identified. Tag IDs may be identified from the wireless transmissions at the tag reader and passed onto the detection server. In some cases, the wireless transmission information is passed on the detection server and the tag ID is identified at the detection server. If a tag ID is not provided by a tag or is not known, the tag ID is determined to be unknown. However, the detection server may store the record of the tag transmission.

The determined tag IDs are compared to stored association information (block 420). The association information may indicate associations between tag IDs. For example, Tags 102, 104 and 106 may share the same ownership information. Data table 342 may have the same owner listed for each of tags 102-106. This owner entry may be a device identifier, a user identifier or some other identifying information that is assigned to or established by the user of the device that is considered to be the owner of the device. If another user is authorized by the owner to use the tag or device attached to the tag, that user may also be considered an owner of the tag. If the ownership information of tag 102 matches the ownership information of tag 104, they are considered to be associated with one another and may be indicated as being authorized tags.

If the ownership information of tag 102 is compared to the ownership information of tag 108 and found to not match, then tag 108 is not associated with tag 102 and may be indicated as being an unauthorized tag.

If one or more tags are not associated with other tags, then a notification is generated (block 430). The detection server may do any number of things to notify the owner. For example, detection server 300 may send a message or alarm to the owner on his smart phone. When an unauthorized tag has been identified, the owner of the item may remove it and disable it by removing the battery or destroy it. The tag may also be reported as "confirmed unauthorized" to allow the tag service to take actions against users that likely misuse the tag service.

Figure 5:
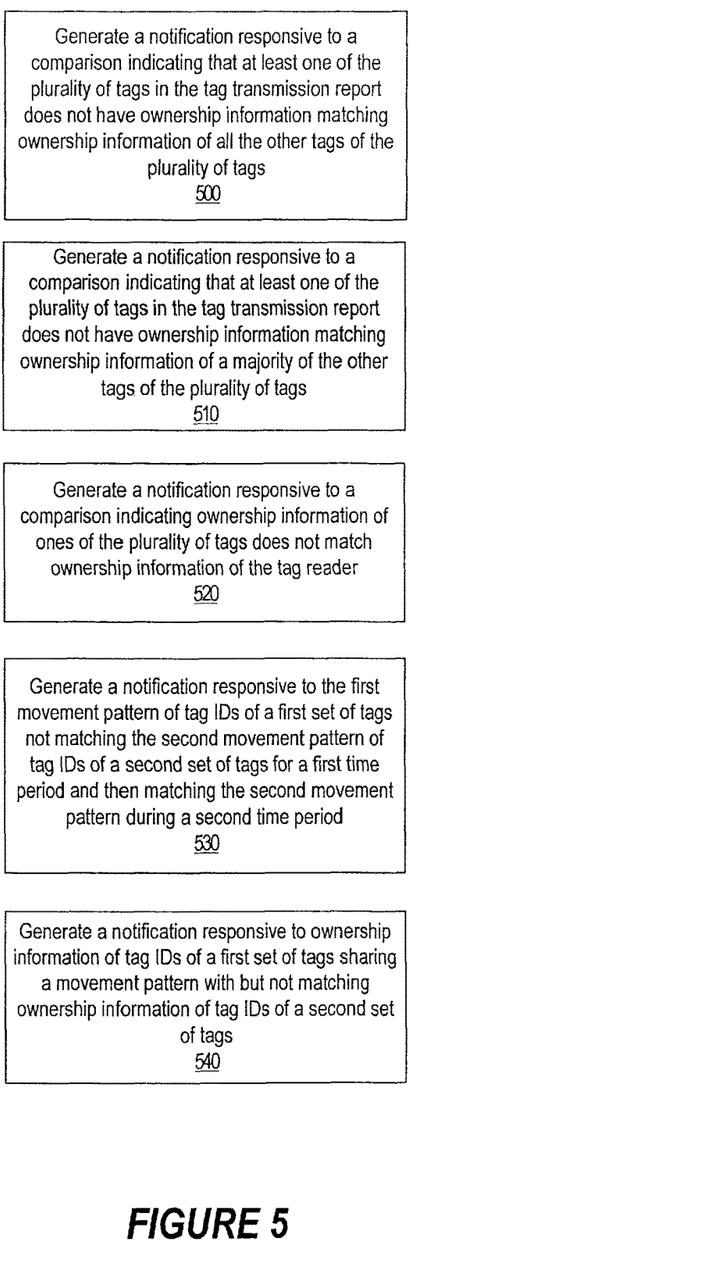
FIG. 5 illustrates further methods for detecting unauthorized tags according to some embodiments.

Various embodiments describe further methods for detecting unauthorized tags, including those shown in FIG. 5. For example, unauthorized tags may be identified by comparing ownership information of tag IDs received by the tag reader to the ownership information of other tag IDs. When the ownership information of one or more tag IDs does not match the ownership information of all the other tag IDs, a notification may be generated (block 500 of FIG. 5).

In another example, when the ownership information of one or more tag IDs does not match the ownership information of tag IDs of a majority of the tags that are read, a notification may be generated (block 510).

In a further example, unauthorized tags may be identified by comparing ownership information of tag IDs received by the tag reader to the ownership information of the tag reader reporting the tag IDs (block 520). In other cases, the tag reader may know which tags to expect transmissions from and if it receives a transmission from a tag that is not known by the tag reader, that tag may be unauthorized.

According to some embodiments, movement patterns of the tags may be observed and compared. This may involve detection of unauthorized tags by measuring movement patterns and relations between tags and tag owners. For example, a notification may be generated when a first movement pattern for a first set of tags does not match a second movement pattern for a second set of tags during a first period and then matches during a second time period (block 530).

A movement pattern may be identified by receiving a tag ID in a first transmission report from a first tag reader in a first location at a first time and then receiving the tag ID in a second transmission report from a second tag reader at a second location at a second time period, indicating a movement of the tag corresponding to the tag ID. Such movement information may be stored as or with association information and be used for association comparisons.

In some embodiments, a location service can be used to determine location information (or have location information determined), using for example GPS, which may be provided to a location service/computer server (location server) where this location information may be associated with the tag readers and stored as location information for the tag IDs. The cloud service may determine tag reader and thus tag ID locations. Tag readers may also supply location information and any other information used to determine a movement pattern within a tag reader proximity or over multiple tag readers.

Figure 8:
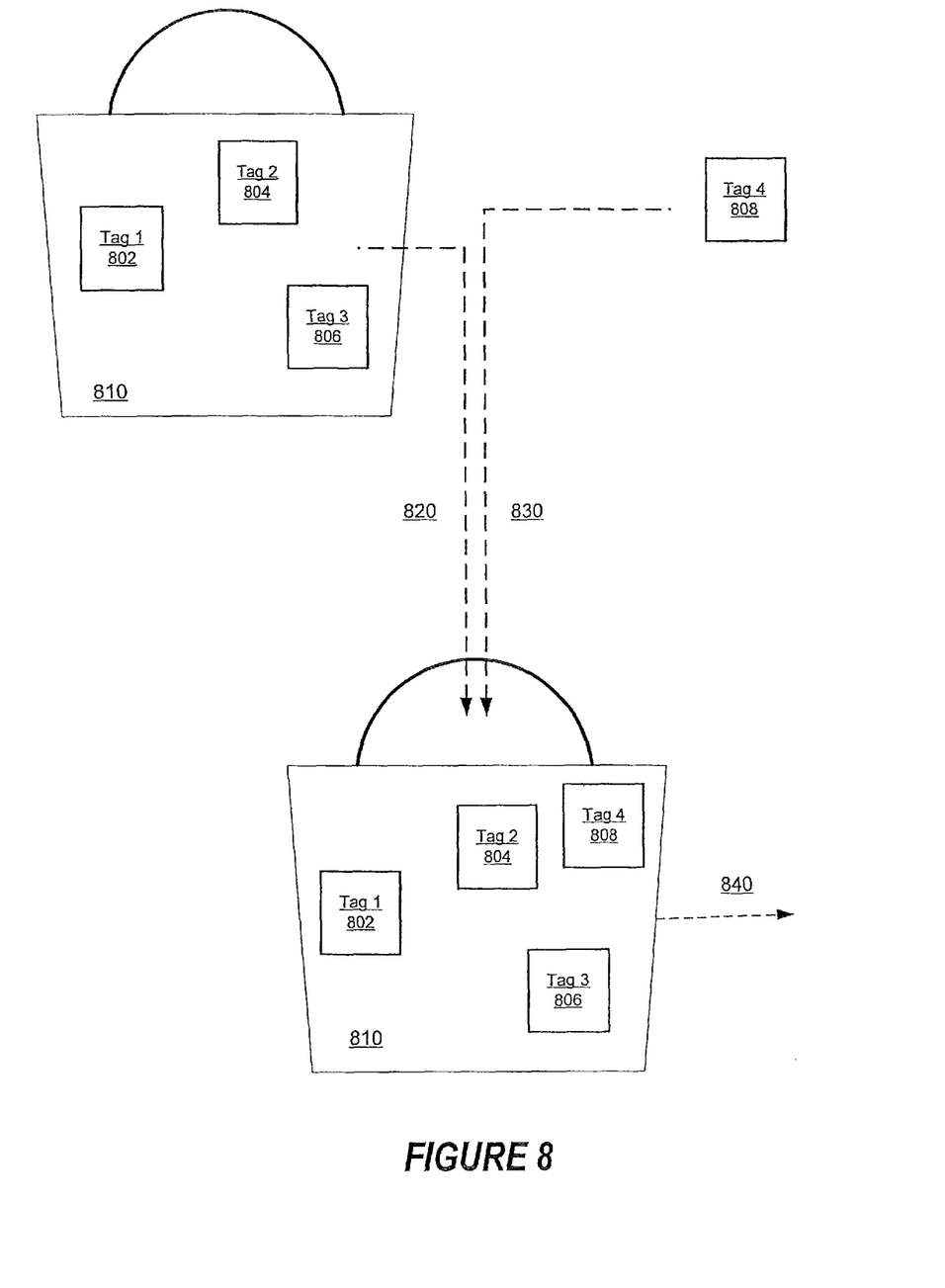
FIG. 8 is a diagram that illustrates movement patterns of tags.

FIG. 8 is used to illustrate these movement patterns. For example, a bag 810 contains moveable objects with respective tags 802-806. These tags follow a first movement pattern 820. Tag 808 follows a second movement pattern 830 that is different and non-matching during a first time period as it originates from another location than the first movement pattern 820. In a second time period, the movement pattern 840 of tags 802-806 matches a movement pattern 840 of tag 808. This may indicate that an unauthorized tag 808 was placed into bag 810 without the knowledge of the owner of tags 802-806, or the owner of moveable objects attached to tags 802-806.

In a further example, there may be a cluster of tags that moves together and then a single tag that later moves with them. Tag ID association comparator 310 may observe the cluster of tags and how they are moving to see if a tag stands out from the other tags. In some cases, one tag may have a certain pattern over part of its recent lifetime while a cluster of tags regularly follows a number of other patterns. Two different owners may have two different movement patterns for their items. If one of these tagged items goes from one cluster of tags to the other, it may be an unauthorized tag.

Some movement patterns may be identified as belonging to the owner. For example, detection server 300 may observe that the tags have consistently been in a certain location overnight. Additionally, these tags have consistently followed a tag reader path from the owner's home to the owner's work and back.

According to some embodiments, a notification may be generated responsive to ownership information of tag IDs of a first set of tags sharing a movement pattern with but not matching ownership information of tag IDs of a second set of tags (block 540). For example, if a tag of one owner starts moving with a movement pattern of another owner, such as movement pattern 840, it may be unauthorized. In some cases, an item of the owner (e.g. bag 810) may be scanned for unauthorized tags. Bag 810 should only include the registered tags of the owner and not any other tags.

A detection server may be specifically configured to prohibit tags of unknown owners from having the same movement pattern as the specified item. For example, the detection server may be configured to notify the owner if an unknown tag moves close to the tag installed in the owner's car for a certain maximum time or distance. Tags owned by the owner or his family members may automatically be part of a set of authorized tags.

A detection service may be stricter in determining unauthorized tags for a specific item than for a general detection of all tags. An owner may also categorize the tagged item further by specifying if the tagged item can contain other tagged items (like a bike, bag or car) or not (like a laptop). This may help the detection service to categorize authorized tags from unauthorized tags and to better manage the movement of certain objects.

Figure 6:
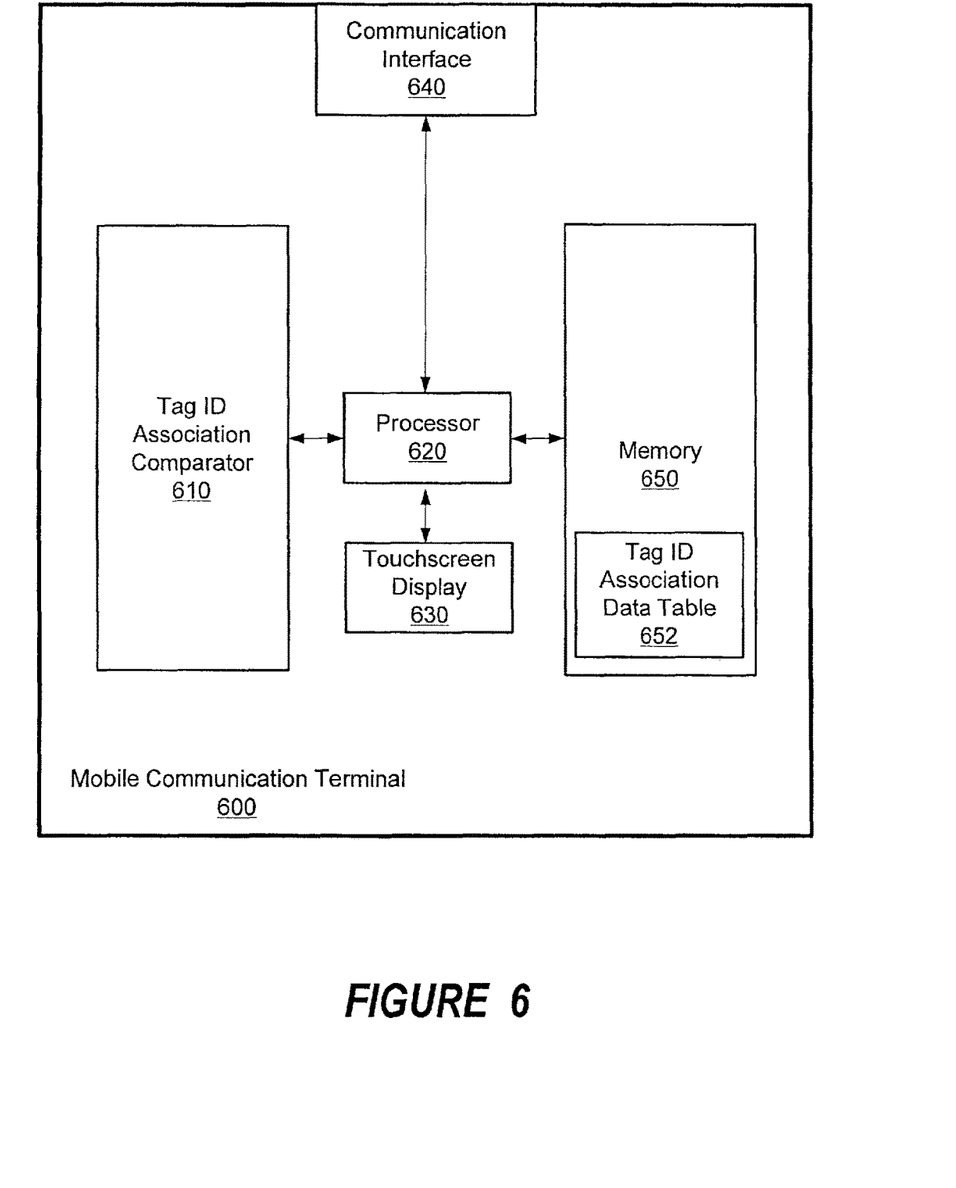
FIG. 6 is a flowchart that illustrates a mobile communication terminal according to some embodiments.
Figure 7:
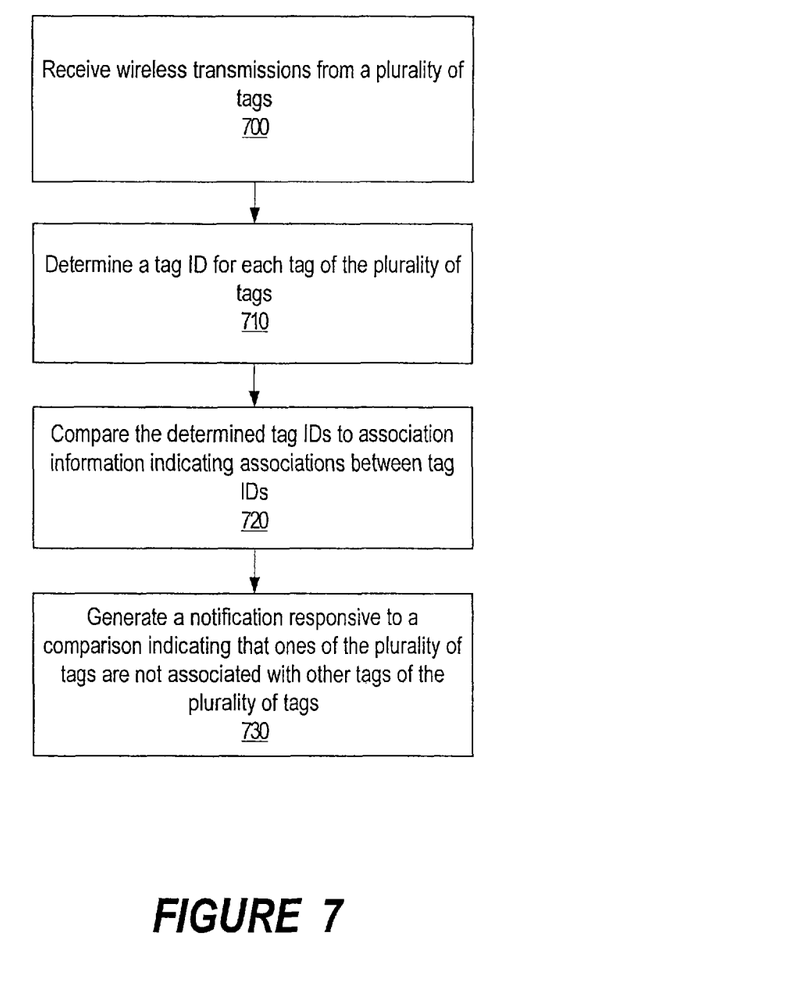
FIG. 7 is a flowchart that illustrates operations of a method for detecting unauthorized tags from the mobile communication terminal of FIG. 6.

According to some embodiments, a mobile communication terminal 600 may perform the functions of detection server 300. For example, mobile communication terminal 600 may act as a tag reader and receive tag transmissions through communication interface 640 (block 700 of FIG. 7). Tag IDs may be determined for the tags (block 710). Processor 620 may cause tag ID association comparator 610 to perform comparisons between tag IDs and association information stored in a data structure in memory 650 (block 720), such as tag ID association data table 652. A notification may be generated when a comparison indicates that one or more tag IDs are not associated with the other tag IDs (block 730).

The mobile communication terminal 600 may also receive configuration information and provide detection information through touchscreen display 630. Mobile communication terminal 600 may also include ownership information for the mobile communication terminal 600 in data table 652. In some cases, mobile communication terminal 600 may itself include a tag with ID information that uniquely identifies the mobile communication terminal 600.

It is to be understood that the present invention is not limited to the particular configuration shown in FIGS. 1 through 8, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIGS. 1 through 8 may be implemented as a single processor system or a multi-processor system in accordance with various embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A computer-implemented method for detecting unauthorized Radio Frequency Identification (RFID) tags by a detection server, the method comprising:
   receiving, by a communication interface of the detection server via a communication network, a tag transmission report from a tag reader, wherein the tag transmission report indicates a plurality of tags, including a first RFID tag and a second RFID tag, from which the tag reader has received wireless transmissions;
   determining, by the detection server, a tag identification (ID) for each tag of the plurality of tags indicated in the tag transmission report;
   comparing, by the detection server, the determined tag IDs to association information, wherein the association information is maintained by the detection server, wherein the association information comprises ownership information for each tag of the plurality of tags, and wherein the association information comprises a first association between a first tag ID of the first RFID tag and a second tag ID of the second RFID tag, and wherein the comparing comprises determining that a subset of the plurality of tags in the tag transmission report comprises matching ownership information and determining that at least one tag of the plurality of tags in the tag transmission report not in the subset does not have ownership information matching the ownership information of the subset of the plurality of tags;
   generating, by the detection server, a notification responsive to the determining that the at least one of the plurality of tags in the tag transmission report not in the subset does not have ownership information matching the ownership information of the subset of the plurality of tags, wherein the notification indicates that the at least one tag of the plurality of tags is not associated with the subset of the plurality of tags; and
   sending, by the detection server, a message comprising the notification to an owner of the subset of the plurality of tags.

2. The method of claim 1,
   wherein the subset comprises a majority of the plurality of tags in the tag transmission report.

3. The method of claim 1, wherein the association information further comprises ownership information for the tag reader, and wherein the generating comprises generating the notification responsive to a comparison indicating ownership information of at least one of the plurality of tags does not match ownership information of the tag reader.

4. The method of claim 1, wherein the subset of the plurality of tags is a first subset of the plurality of tags, wherein the plurality of tags further comprises a second subset of tags distinct from the first subset, wherein the comparing further comprises determining that the first subset of the plurality of tags share a movement pattern and determining that the second subset of tags of the plurality of tags also share the movement pattern,
   wherein the generating comprises generating the notification responsive to ownership information of tag IDs of the first subset not matching ownership information of tag IDs of the second subset of tags and responsive to the first subset and the second subset sharing the movement pattern.

5. The method of claim 4, further comprising:
receiving a tag ID in a first tag transmission report from a first tag reader located at a first location at a first time,
receiving the tag ID in a second tag transmission report from a second tag reader located at a second location at a second time later than the first time, and
identifying the movement pattern based on movement of the tag corresponding to the tag ID from the first location to the second location.

6. The method of claim 1, wherein the subset of the plurality of tags is a first subset of the plurality of tags and wherein the plurality of tags further comprises a second subset of tags distinct from the first subset, wherein the comparing comprises:
(a) determining, during a first time period, that the first subset of the plurality of tags share a first movement pattern and that the second subset of the plurality of tags share a second movement pattern, wherein the first movement pattern does not match the second movement pattern; and
(b) determining, during a second time period, that the first subset of the plurality of tags and the second subset of the plurality of tags share a third movement pattern, and
wherein the generating comprises generating the notification responsive to the first movement pattern not matching the second movement pattern for the first time period and responsive to the first subset of the plurality of tags and the second subset of the plurality of tags sharing the third movement pattern during the second time period.

7. A computer-implemented method for detecting unauthorized Radio Frequency Identification (RFID) tags, the method comprising:
receiving, by a wireless communication interface of a tag reader via a short range wireless communication protocol, wireless transmissions from a plurality of tags including a first RFID tag and a second RFID tag;
determining a tag identification (ID) for each tag of the plurality of tags;
comparing the determined tag IDs to association information, wherein the association information comprises ownership information for each tag of the plurality of tags, and includes a first association between a first tag ID of the first RFID tag and a second tag ID of the second RFID tag, and wherein the comparing comprises determining that a subset of the plurality of tags comprises matching ownership information and determining that at least one tag of the plurality of tags not in the subset does not have ownership information matching the ownership information of the subset of the plurality of tags;
generating a notification responsive to the determining that the at least one of the plurality of tags not in the subset does not have ownership information matching the ownership information of the subset of the plurality of tags, wherein the notification indicates that the at least one tag of the plurality of tags is not associated the subset of the plurality of tags; and
sending a message comprising the notification to an owner of the subset of the plurality of tags.

8. The method of claim 7,
wherein the subset comprises a majority of the plurality of tags.

9. The method of claim 7, wherein the association information comprises ownership information for the tag reader, and wherein the generating comprises generating the notification responsive to a comparison indicating ownership information of at least one tag of the plurality of tags does not match ownership information of the tag reader.

10. The method of claim 7, wherein the subset of the plurality of tags is a first subset of the plurality of tags, wherein the plurality of tags further comprises a second subset of tags distinct from the first subset, wherein the comparing further comprises determining that the first subset of the plurality of tags share a movement pattern and determining that the second subset of the plurality of tags also share the movement pattern,
wherein the generating comprises generating the notification responsive to ownership information of tag IDs of the first subset of the plurality of tags not matching ownership information of tag IDs of the second subset of the plurality of tags and responsive to the first subset of the plurality of tags and the second subset of the plurality of tags sharing the movement pattern.

11. The method of claim 10, further comprising:
receiving a tag ID from a first tag reader located at a first location at a first time;
receiving the tag ID from a second tag reader at a second location at a second time later than the first time; and
identifying the movement pattern based on movement of the tag corresponding to the tag ID from the first location to the second location.

12. The method of claim 7, wherein the subset of the plurality of tags is a first subset of the plurality of tags and wherein the plurality of tags further comprises a second subset of tags distinct from the first subset, wherein the comparing comprises:
(a) determining, during a first time period, that the first subset of the plurality of tags share a first movement pattern and that the second subset of the plurality of tags share a second movement pattern, wherein the first movement pattern does not match the second movement pattern; and
(b) determining, during a second time period, that the first subset of the plurality of tags and the second subset of the plurality of tags share a third movement pattern,
wherein the generating comprises generating the notification responsive to the first movement pattern not matching the second movement pattern for the first time period and responsive to the first subset of the plurality of tags and the second subset of the plurality of tags sharing the third movement pattern during the second time period.

13. A mobile communication terminal, comprising:
a processor;
a wireless communication interface coupled to the processor that is configured to receive wireless transmissions from a plurality of tags, including a first Radio Frequency Identification (RFID) tag and a second RFID tag, via a short range wireless communication protocol;
a memory coupled to the processor and comprising computer readable program code embodied in the memory that when executed by the processor causes the processor to perform operations comprising:
determining a tag identification (ID) for each tag of the plurality of tags;
comparing the determined tag IDs to association information indicating associations between tag IDs, wherein the association information comprises ownership information for each tag of the plurality of tags, wherein the association information includes a first association between a first tag ID of the first RFID tag and a second tag ID of the second RFID tag, and wherein the comparing comprises determining that a subset of the plurality of tags comprises matching ownership information and determining that at least one tag of the plurality of tags not in the subset does not have ownership information matching the ownership information of the subset of the plurality of tags;

generating a notification responsive to the determining that the at least one of the plurality of tags not in the subset does not have ownership information matching the ownership information of the subset of the plurality of tags, wherein the notification indicates that the at least one tag of the plurality of tags is not associated with the subset of the plurality of tags; and sending a message comprising the notification to an owner of the subset of the plurality of tags.

14. The mobile communication terminal of claim 13, wherein the subset comprises a majority of the plurality of tags.

15. The mobile communication terminal of claim 13, wherein the association information further comprises ownership information for the mobile communication terminal, and wherein the generating comprises generating the notification responsive to a comparison indicating ownership information of at least one of the plurality of tags does not match ownership information of the mobile communication terminal.

16. The mobile communication terminal of claim 13, wherein the subset of the plurality of tags is a first subset of the plurality of tags, wherein the plurality of tags further comprises a second subset of tags distinct from the first subset, and wherein the memory coupled to the processor comprises further computer readable program code embodied in the memory that when executed by the processor causes the processor to perform further operations comprising:

(a) determining, during a first time period, that a first subset of the plurality of tags share a movement pattern; and (b) determining that a second subset of the plurality of tags also share the movement pattern, wherein the generating comprises generating the notification responsive to ownership information of tag IDs of the first subset of the plurality of tags not matching ownership information of tag IDs of the second subset of the plurality of tags and responsive to the first subset of the plurality of tags and the second subset of the plurality of tags sharing the movement pattern.

* * * * *